Figure 1:
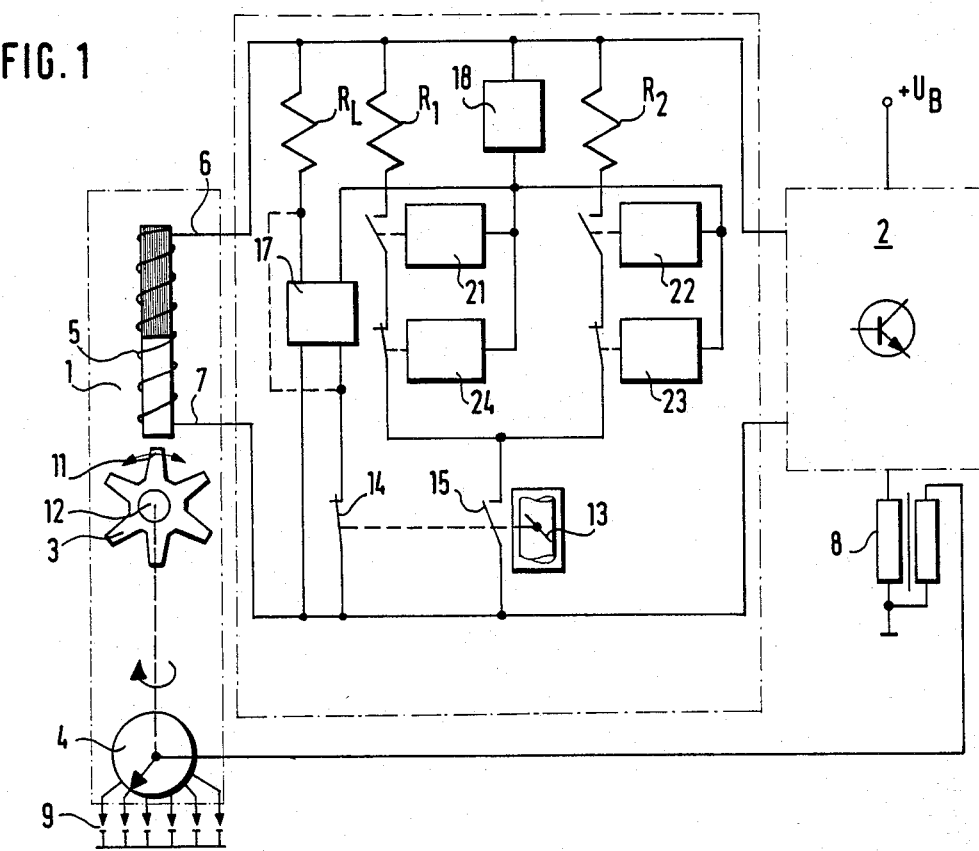

United States Patent [19]

Krappel et al.

[11] Patent Number: 4,506,643
[45] Date of Patent: Mar. 26, 1985

[54] IGNITION SYSTEM FOR INTERNAL COMBUSTION ENGINES

[75] Inventors: Alfred Krappel, Ismaning; Johannes Guggenmos, Dirlewang; Josef Holzmann, Munich, all of Fed. Rep. of Germany

[73] Assignee: Bayerische Motoren Werke A.G., Fed. Rep. of Germany

[21] Appl. No.: 369,020

[22] PCT Filed: Aug. 5, 1981

[86] PCT No.: PCT/EP81/00114
 § 371 Date: Apr. 9, 1982
 § 102(e) Date: Apr. 9, 1982

[87] PCT Pub. No.: WO82/00494
 PCT Pub. Date: Feb. 18, 1982

[30] Foreign Application Priority Data

Aug. 9, 1980 [DE] Fed. Rep. of Germany ....... 3030190

[51] Int. Cl.³ .............................................. F02P 5/08
[52] U.S. Cl. .................................................. 123/418
[58] Field of Search ............... 123/414, 418, 419, 425, 123/617

[56] References Cited

U.S. PATENT DOCUMENTS

| | | | |
|---|---|---|---|
| 3,593,693 | 7/1971 | Seelmann-Eggebert | 123/37 |
| 3,768,451 | 10/1973 | Okamoto | 123/415 |
| 3,946,708 | 3/1976 | Saita | 123/418 |
| 4,140,092 | 2/1979 | Lanning et al. | 123/407 |
| 4,144,854 | 3/1979 | Katada et al. | 123/418 |
| 4,155,341 | 5/1979 | Fernquist et al. | 123/602 |
| 4,168,691 | 9/1979 | Sawada et al. | 123/407 |
| 4,326,486 | 4/1982 | Mezger et al. | 123/418 |
| 4,335,692 | 6/1982 | Miura | 123/418 |

FOREIGN PATENT DOCUMENTS

| | | |
|---|---|---|
| 1253517 | 11/1967 | Fed. Rep. of Germany . |
| 1278175 | 9/1968 | Fed. Rep. of Germany . |
| 2425595 | 12/1974 | Fed. Rep. of Germany . |
| 2738886 | 3/1979 | Fed. Rep. of Germany . |

Primary Examiner—P. S. Lall
Assistant Examiner—W. R. Wolfe
Attorney, Agent, or Firm—Craig & Burns

[57] ABSTRACT

The timing of the signal to the primary of an ignition coil is controlled by selectively connecting impedance to a transducer in accordance with an engine operating parameter such as revolutions per minute.

16 Claims, 8 Drawing Figures

IGNITION SYSTEM FOR INTERNAL COMBUSTION ENGINES

The invention, is based on DOS No. 2,619,443.

In the conventional ignition system, the phase shift of the transducer signal is utilized for a retarded spark setting in order to limit the number of revolutions per minute, rpm, of internal combustion engines to protect the same against overspeeding. This phase shift is produced by the armature reaction in inductive transducers and increases with the armature reaction in case of a rising rpm of the engine due to the thus-increasing load on the transducer. To be able to utilize this phase shift in a controlled fashion, an impedance is additionally connected as a load to the transducer after a predetermined, maximally permissible rpm. Thereby the ignition timing is suddenly retarded by a certain value, the power of the engine drops, and a further increase in rpm rpm is prevented in this way.

It is an object of the invention to further develop the ignition timing adjustment attainable by the phase shift of the transducer signal with relatively simple means for utilization primarily in partially electronic ignition systems with a mechanical centrifugal basic adjustment of the ignition timing and with a likewise mechanical auxiliary adjustment by pneumatically operated advance spark and delayed spark cells, but also in fully electronic ignition systems with predetermined ignition timing values.

It is a further object of the invention to effect the further development such that desired deviations from the basic set values of the ignition timing can be obtained in the entire operating speed range in dependence on various operating parameters besides the rpm.

It is another object of the invention that the advance spark and delayed spark cells, connected with high cost in construction, with the associated control devices be at least partially eliminated.

It is another object of the invention to provide an electronic adjusting device wherein a delayed setting in a multistage or infinitely variable fashion is effected, as well as the restoration of the ignition timing to the basic setting with additional values of operating parameters besides the rpm, to meet the requirement of the engine for spark setting values, deviating from the basic setting under certain conditions, in a simple fashion.

It is another object of the invention to control timing of the signal to the primary of an ignition coil by connecting an impedance as an additional load to a transducer in accordance with a first engine operating primary.

It is another object of the invention to control timing of the signal to the primary of an ignition coil by selectively connecting and disconnecting an impedance in accordance with one of two engine operating parameters.

It is another object of the invention to control timing of the signal to the primary of an ignition coil by selectively connecting and disconnecting an impedance to a transducer in accordance with an engine parameter such as one or more of operating temperature, operating pressure, intake air, supercharger air, exhaust gas, engine vibration, self-ignition characteristic, fuel quality, operating power, the power control members and the transmission ratio as in automotive vehicles.

It is another object of the invention to control the timing of the signal to the primary of an ignition coil by connecting and disconnecting an impedance means to a transducer means by way of a delay means.

These and other objects, features and advantages of the present invention will become more apparent from the following description when taken in connection with the accompanying drawing.

The drawing illustrates several embodiments of the invention and, respectively with the use of diagrams, the associated adjusting functions.

Figure 2:
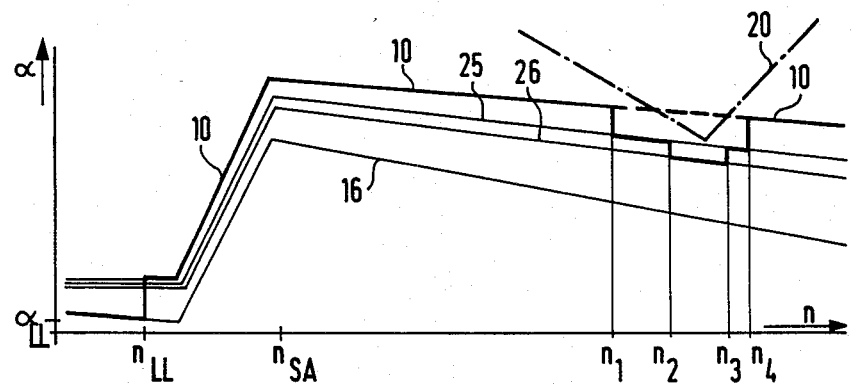
Figure 3:
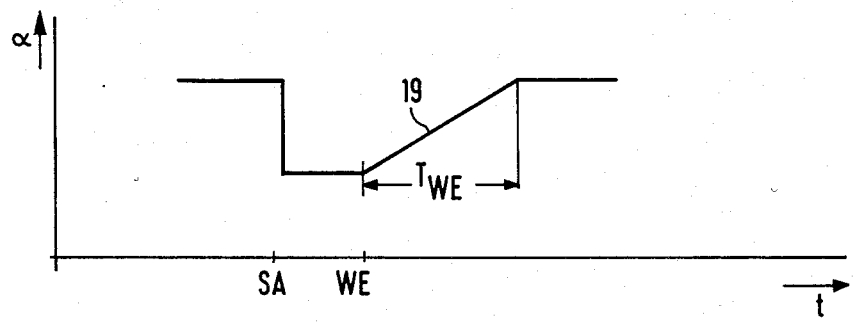
Figure 4:
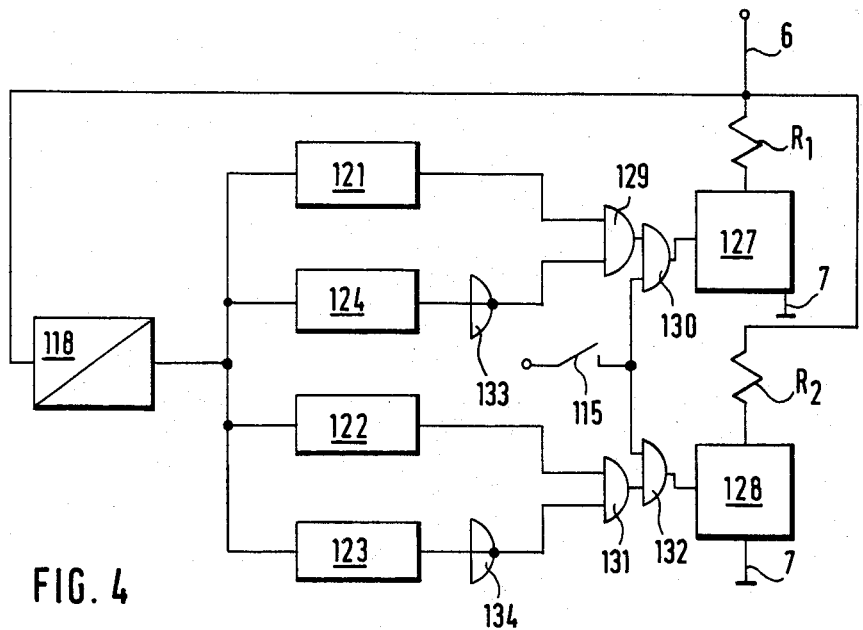
Figure 5:
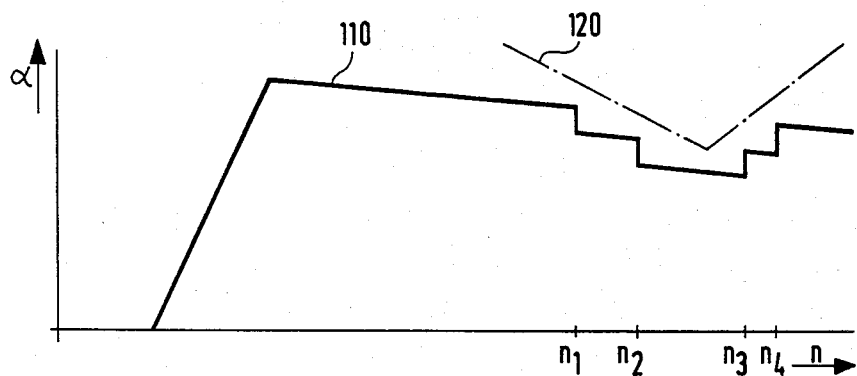
Figure 6:
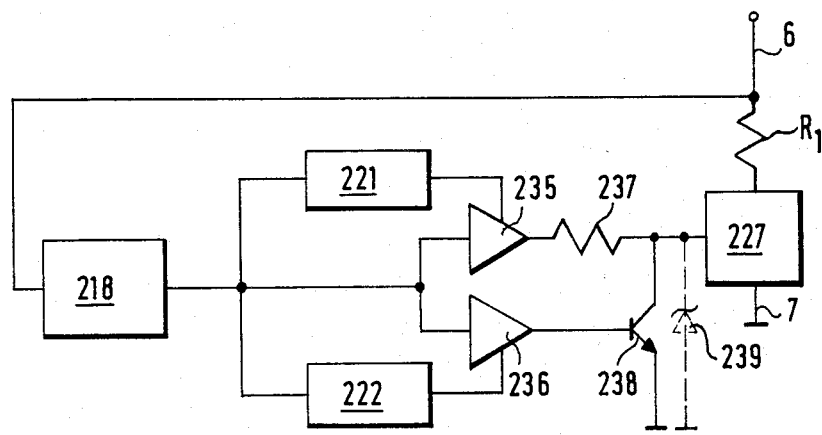
Figure 7:
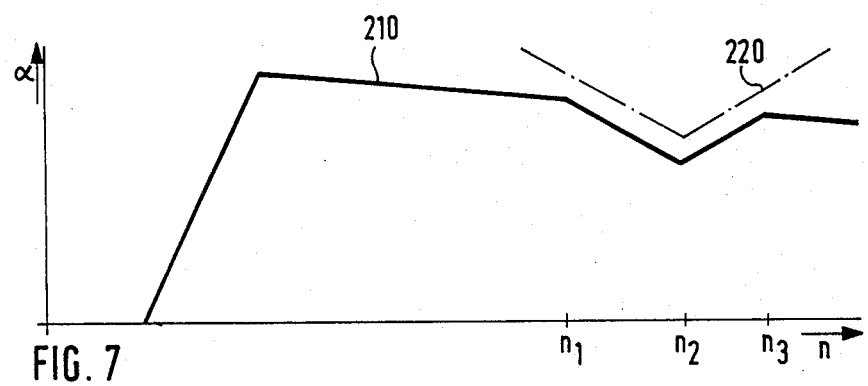
Figure 8:
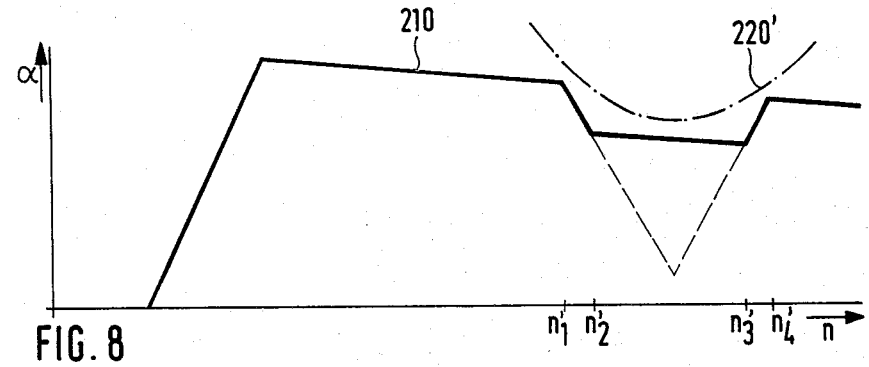

FIG. 1 shows the electrical circuit of a partially electronic ignition system for a 6-cylinder internal combustion engine, shown in part as a block circuit diagram, FIG. 2 shows the diagram of the ignition timing curve over the number of revolutions of the engine for the circuit of FIG. 1, FIG. 3 shows the diagram of the additional, temporally controlled spark adjustment for the circuit of FIG. 1, FIG. 4 shows part of the circuit according to FIG. 1 with semiconductor switching elements, FIG. 5 shows the diagram of the ignition timing curve over the number of revolutions for FIG. 4, FIG. 6 shows another modification of the circuit portion according to FIG. 4, FIG. 7 shows the diagram of the ignition timing curve for a circuit supplement provided in FIG. 6, plotted over the number of revolutions, and FIG. 8 shows the diagram of the ignition timing curve over the number of revolutions for a circuit supplement provided in FIG. 6.

The objects set forth above are attained by the invention in a surprisingly simple way. It is possible with simple, customary switching means to connect the impedance to the transducer in such a way that respectively desired deviations of the ignition timing from the basic setting are achieved when the provided switching means are triggered by a specific operating parameter.

The delayed setting, triggered at a specific value of an operating parameter is, according to the invention, once more increased or reset again at a further value of the same or another operating parameter of the engine. Thus, the invention makes it possible, for example, to adapt the ignition timing curve to a dip in the knocking limit occurring over the rpm of the engine even in partially electronic ignition systems, as has been known for fully electronic digital ignition systems (ATZ, issue 12/79, page 626). The ignition timing can be reset by the invention with the increase in the knocking limit, while the rpm rises further increases, back to the value of the basic setting given without load exerted by the impedance. Losses in power of the engine by an ignition timing set at too great a delay precisely in the zone of maximum power are thereby avoided.

Delayed setting during idling operation is attained by means of the invention in an especially simple manner, eliminating a pnuematically actuated delayed spark cell.

A utilization of the invention in fully electronic ignition systems provides the possibility of correcting the predetermined ignition timing in a simple way according to the invention in the entire functional range, or only in selected partial ranges, and adapting this timing, for example, to a locally or temporally caused reduction in the anti-knock property of the fuel.

The circuit of the ignition system according to FIG. 1 comprises an inductive transducer 1 actuating a conventional ignition control device 2 with ignition pulses. The transducer 1 consists essentially of a stellate pulse wheel 3 mechanically driven, together with a high-voltage ignition distributor 4, by the engine in a manner not shown according to the ignition pulses associated with the six cylinders, and an inductive coil 5, the connection lines 6 and 7 of which are connected to the ignition control device 2. The ignition control device 2 is connected by way of an ignition coil 8 to the input of the ignition distributor 4, which latter distributes the ignition current, stepped up by the ignition coil, to the spark plugs 9.

In order to obtain an ignition timing corresponding to the respective requirements of the engine according to the ignition timing curve 10 illustrated in FIG. 2, the pulse wheel 3 of the inductive transducer 1 can, on the one hand, be set forwards and backwards in the rotation direction relatively to its drive shaft 12 by means of a customary centrifugal adjustment according to the arrows 11. By this mechanical adjusting device, a customary course of an ignition timing curve 10 results, corresponding in the region of the idling speed $n_L$ to an ignition timing with an ignition angle $\alpha$ of a low value and thus close to the top dead center position TDC of the pistons of the engine. In a region of the rpm n lying above the idling speed $n_{LL}$, the ignition timing is adjusted toward "early" so that ignition takes place by a specific larger ignition angle $\alpha$ before TDC. This advance setting again decreases constantly and to a minor extent after reaching its maximum value, due to an armature reaction occurring in the inductive transducer 1 upon a further increase in the rpm and thus a rise in the transducer voltage.

Resistors $R_L$, $R_1$, and $R_2$ are connected between the junction lines 6 and 7 of the transducer 1 to the ignition control device 2 as an impedance for placing an additional load on the circuit of transducer 1 and, depending on the actuation and deactivation of several control switches, additionally burden the circuit of the inductive transducer 1 and thereby likewise effect a reduction of the ignition setting angle. For this purpose, idling switch 14 and full load switch 15, connected with the operation of a throttle valve 13 of the engine, are associated with the resistor $R_L$, on the one hand, and with the resistors $R_1$ and $R_2$, on the other hand. The idling switch 14 is likewise closed when the throttle valve 13 is closed and thus inserts the resistor $R_L$ in correspondence with the dashed line in the connection between the connecting lines 6 and 7 of the transducer 1 to the ignition control device 2. The ignition angle $\alpha$ is thereby adjusted during idling operation of the engine by an additional amount toward "late". Thereby the ignition angle $\alpha_L$ results as illustrated in FIG. 2, corresponding to the ignition timing curve 16 displaced toward "late". This delayed setting also occurs, though, over the idling speed $N_L$ but this has no adverse effect with the throttle valve being closed and thus in the push operation of the engine especially if the fuel supply of the engine exhibits a push cutoff effective approximately above a speed $n_S$.

Alternatively to the direct connection between the resistor $R_L$ and the switch 14, illustrated in dashed lines, a delay member 17 is included in FIG. 1 in the connecting line of the idling switch 14, this member exhibiting additionally a direct junction point to the connecting line 7 and a further junction point to a signal converter 18 actuated by the transducer 1. This timer switch element 17 is constructed with customary switching elements in such a way that it connects, according to FIG. 3, the resistor $R_L$ with the idling switch 14 being closed and at an rpm n lying above the speed $n_S$ governing for a push cutoff SA of the fuel feed, to the transducer 1 and accordingly adjusts the ignition timing toward "late". The delay member 17 furthermore contains a timing circuit made up of conventional switching means which, when the value drops below the speed $n_S$ or when the idling switch 14 is opened, severs the resistor $R_L$, with optionally variable temporal delay and thus with a gradually rising resistance value until the interruption of the connection of the two connecting lines 6 and 7, from this connection. Thereby, according to FIG. 3, a curve 19 of the ignition angle $\alpha$ over the time t results corresponding, after the sudden drop of the ignition angle $\alpha$ during onset of the push cutoff SA up to the reinstatement WE, to the course of the ignition adjustment curve 16 determined by the resistor $R_L$ and rising again to the value according to the ignition adjustment curve 10 starting with the reinstatement WE over the time $T_{WE}$ in accordance with the function of the delay member 17. This temporally delayed rise in the ignition angle $\alpha$ causes a likewise temporally delayed rise in the engine torque. Since the torque is reduced at an ignition angle $\alpha$ which is smaller than the value adapted according to the ignition timing curve 10 to the residual value of the torque, this reduced torque prevails at the instant of reinstatement WE, preventing an accelerating surge of the engine which is uncomfortably noticeable with full value of the torque.

FIG. 2 shows in the upper zone of the speed n a dip of the knocking limit 20 of the engine. This knocking limit 20 intersects with the ignition timing curve 10 so that in this zone of the speed n a self-ignition deleterious to the engine can occur in the full load range. To avoid a disadvantageous reduction of the ignition angle $\alpha$ to a curve which is lower over the entire range of the rpm n corresponding to the ignition timing curve 16 and thus to avoid having to forego correspondingly higher values of the torque and the power outside of the self-ignition range, the possibility is provided as shown in FIG. 1, with the full load switch 15 being closed, to connect and disconnect the resistors $R_1$ and $R_2$ by way of speed switches 21, 22, 23, and 24 at the levels of rpm $n_1$, $n_2$, $n_3$, and $n_4$ between the connecting lines 6 and 7. This is done by providing that the speed switch 21, actuated by the signal converter 18, closes when the ignition timing curve 10 approaches the knocking limit 20 at a speed $n_1$ and inserts the resistor $R_1$ by way of the full load switch 15, which is likewise closed at full load, between the connecting lines 6 and 7 as an additional load on the transducer 1. Thus, the ignition angle $\alpha$ drops from the ignition timing curve 10 to the ignition timing curve 25. The ignition angle $\alpha$ thereby remains at an adequate distance from the value at which, according to the knocking limit 20, self-ignition would occur during full load.

Assuming that also the ignition timing curve 25 would again approach too closely the knocking limit 20 at the speed $n_2$, the further speed switch 22 is provided, which is actuated likewise by the signal converter 18 and connects the resistor $R_2$ in parallel to the resistor $R_1$ as a further load on the transducer 1 by way of the full load switch 15 between the connecting lines 6 and 7 of the transducer 1, effecting a further reduction of the ignition angle $\alpha$ to the ignition timing curve 26. This ignition timing curve 26 keeps a sufficient distance from the lowest value of the knocking limit 20.

Upon a renewed rise of the knocking limit 20 in the zone of the rpm $n_3$ and $n_4$, the signal converter 18 actuates the speed switches 23 and 24 which separate the resistors $R_1$ and $R_2$ from the connection between the connection lines 6 and 7 by interrupting their leads to the full load switch 15. Thus, the ignition angle $\alpha$ increases again at the speed $n_3$ to the ignition timing curve 25 and at the speed $n_4$ to the ignition timing curve 10. Thereby, it is ensured that the torque and the power of the engine can be fully exploited in the region of the maximum rpm of the engine where the knocking limit 20 again exhibits an adequate distance from the ignition timing curve 10. A reduction of the ignition angle $\alpha$ to the ignition timing curve 26 over the entire speed range thus is unnecessary, so that losses of the maximum performance of the engine are avoided.

The circuit portion shown in FIG. 4 contains in correspondence with FIG. 1 a signal converter 118 and two resistors $R_1$ and $R_2$ jointly connected to the connection line 6 leading to the ignition control stage 2, not shown herein. Electronic final stages 127 and 128, respectively, are connected after the resistors $R_1$ and $R_2$. These stages are actuated by threshold switches 121, 122, 123, and 124 in correspondence with the engine speeds $n_1$, $n_2$, $n_3$, and $n_4$ in pairs via respectively two AND gates 129 and 130 as well as 131 and 132. Respectively one inverter 133 and 134 for reversing the voltage signal for actuation of the AND gates 129 and 131 is connected in the connection lines between the threshold switches 123 and 124, on the one hand, and the AND gates 129 and 130, on the other hand. The AND gates 130 and 132 are connected with one of their inputs respectively to the output of the AND gates 129 and 131, on the one hand, and with their second input respectively to a full load switch 115. The output of each AND gate 130 and 132 is connected to the input of the control stages 127 and 128, respectively.

As shown in FIG. 5, the function of the circuit according to FIG. 4 corresponds to the corresponding circuit portion of FIG. 1. At full load of the engine and thus with the full load switch 115 being closed, the output of the threshold switch 121 yields, after the speed $n_1$ has been reached, a "High" level to the AND gate 129. The output of the second threshold switch 124, in contrast thereto, transmits a "Low" level to the inverter 133 until the higher speed $n_4$ has been reached; the inverter converts this "Low" level to "High" level and transmits same to the second input of the AND gate 129 so that the latter establishes a connection to the subsequently connected AND gate 130 together with the "High" level from the closed full load switch 115 and connects the resistor $R_1$ to ground via the final stage 127. Thus, the resistor $R_1$, once the speed $n_1$ has been exceeded, is connected to the connection line 6 and therefore is connected as a load to the transducer 1 according to FIG. 1. This results, according to FIG. 5, in a lowering of the ignition angle $\alpha$ before the ignition timing curve 110 approaches too closely the knocking limit 120.

Upon reaching of the speed $n_2$, the resistor $R_2$ is connected to the transducer 1 by the threshold switches 122 and 123, the inverter 134, the AND gates 131 and 132, the full load switch 115, and the final stage 128 in the same way as the resistor $R_1$ in case of the speed $n_1$. Thereby a further resetting of the ignition timing curve 110 by a further value of the ignition angle $\alpha$ results.

With the full load operation of the engine continuing and thus with the full load switch 115 remaining in the closed position and with a further rising rpm n above the value $n_3$, the threshold switch 123 is triggered at the speed $n_3$ so that the "High" level at its output is transformed by the inverter 134 into a "Low" level, and is transmitted to the AND gate 131 which thereby becomes nonconductive. The output of this AND gate also effects blockage of the AND gate 132, so that, in turn, the output thereof blocks the final stage 128 and thereby the connection of the resistor $R_2$ and its load on the transducer 1 is interrupted. This resets the ignition timing $\alpha$ at the speed $n_3$ again somewhat in the direction toward a higher advance spark value. The same switching procedure is repeated when reaching the speed $n_4$ by response of the threshold switch 124 and the subsequently connected switching elements 133, 129, 130, and 127. Thereby the load on the transducer 1 by the resistor $R_1$ is also eliminated, and the ignition angle $\alpha$ is again reset to the normal course of the ignition timing curve 110 according to FIG. 5. This resetting of the ignition angle $\alpha$ takes place, when the engine is relieved of its load by opening the full load switch 115, also at all times within the range between the speeds $n_1$ and $n_4$ whereby the ignition angle requirement can be fully exploited at partial load without knocking tendency.

In FIG. 6, the circuit portion according to FIG. 4 is further modified. In this arrangement, only two threshold switches 221 and 222 are connected after the signal converter 218. The outputs of these threshold switches are connected to the current supply terminals of respectively one amplifier 235 and 236, the inputs of which are connected to the signal converter 218, and the outputs of which are connected, on the one hand, via a resistor 237 to the control input of an electronic final stage 227 establishing the connection of a resistor $R_1$ with ground, while the output of the second amplifier 236 is connected to the base of a transistor 238, the collector-emitter path of which constitutes a connection of the control input of the final stage 227 to ground. Alternatively, the cathode of a Zener diode 239 is connected to the aforementioned control input of the final stage 227, the anode of this Zener diode being connected to ground.

As illustrated in FIG. 7, the circuit according to FIG. 6 results in a closer adaptation of the ignition angle $\alpha$ to a dip of the knocking limit 220, by a constant reduction of the ignition angle $\alpha$ starting with the speed $n_1$ to the speed $n_2$ and a constant increase of the ignition angle $\alpha$ from the speed $n_2$ to the speed $n_3$, this adaptation being within the range of these speeds. This is attained in this circuit by providing that the amplifier 235 with a rising value of the signal from the signal converter 218 controls the final stage 227 in an infinitely variable fashion after being released by the threshold switch 221 at the speed $n_1$ via the resistor 237. Consequently, the amplifier 235 connects the resistor $R_1$ continuously as a load to the transducer 1 of FIG. 1. When the speed $n_2$ has been reached, the amplifier 236 likewise connects the transistor 238 with infinitely variable control to the input of the final stage 227 after release by the threshold switch 222, whereby the input signal of the final stage 227 is conducted increasingly to ground and the final stage 227, likewise in a continuous fashion, eliminates again the disconnection of the resistor $R_1$ until the values of the ignition timing curve 210 have been reached. Thereby, infinitely varied adjusting values are obtained for the ignition angle $\alpha$, which values can be closely adapted to the course of the knocking limit 220.

By the additional inclusion of the Zener diode 239 into the circuit portion of FIG. 6, the objective is attained according to FIG. 8 that, after reaching the switching value of the Zener diode 239, the control voltage for the final stage 227 is kept constant. Accordingly, starting with the number of revolutions $n_2'$, the reduction of the ignition angle $\alpha$ remains constant until the beginning of functioning of the transistor 238 at the number of revolutions $n_3'$. With a further increase in the speed n from $n_3'$ to $n_4'$ the ignition angle $\alpha$ is again adjusted to the values according to the ignition timing curve 210. This construction of the circuit portion makes it possible to achieve a close adaptation of the ignition timing curve 210 to a wide dip of the knocking limit 220'.

All circuit versions of the invention offer the possibility of closely adapting, with minor expenditure, an ignition timing curve or also an ignition curve pattern of a partially electronic or fully electronic ignition circuit in any desired speed and load ranges of internal combustion engines in dependence on various parameters to a special requirement for a reduced advanced sparking value.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. An ignition system for internal combustion engines having an ignition coil with primary circuit comprising
    an inductive transducer means for timing control of the primary circuit of the ignition coil,
    impedance means for varying the phase position of an output signal of the inductive transducer means for varying the instant of ignition,
    first means for connecting at least a portion of the impedance means to the transducer means as an additional load in dependence on a first value of a first operating parameter of the engine,
    second means for performing at least one of connecting and disconnecting at least a portion of the impedance means in dependence on at least a value of a second operating parameter,
    means for connecting at least a portion of the impedance means to the transducer means during idling operation of the engine and disconnecting the impedance means from the transducer means in the range of operation under load,
    wherein said internal combustion engine has an accelerator pedal connected to a power regulating member and wherein the means for connecting comprises
    a mechanically operated switch means for connecting the impedance means to the transducer means, and
    the switch means being closed in the idling position of the power-regulating member.

2. An ignition system for internal combustion engines having an ignition coil with primary circuit comprising
    an inductive transducer means for timing control of the primary circuit of the ignition coil,
    impedance means for varying the phase position of an output signal of the inductive transducer means for varying the instant of ignition,
    first means for connecting at least a portion of the impedance means to the transducer means as an additional load in dependence on a first value of a first operating parameter of the engine, and
    second means for performing at least one of connecting and disconnecting at least a portion of the impedance means in dependence on at least a value of a second operating parameter different from said first parameter.

3. An induction system according to claim 2, comprising
    means for connecting at least a portion of the impedance means to the transducer means during idling operation of the engine and
    disconnecting the impedance means from the transducer means in the range of operation under load.

4. An ignition system according to claim 2, wherein the values for the first and second operating parameters of the engine are at least one value of, respectively, operating temperature, operating pressure, the intake air, the supercharger air, the exhaust gas, the engine vibration, the self-ignition characteristic, the fuel quality, the operating power, one of the power control members, the transmission ratio, as in automotive vehicles.

5. An ignition system according to claim 2, wherein the means for performing connecting and disconnecting comprises at least
    a delay means for connecting the impedance means to the transducer means.

6. An ignition system for internal combustion engines having an ignition coil with primary circuit comprising
    an inductive transducer means for timing control of the primary circuit of the ignition coil,
    impedance means for varying the phase position of an output signal of the inductive transducer means for varying the instant of ignition,
    first means for connecting at least a portion of the impedance means to the transducer means as an addition load in dependence on a first value of a first operating parameter of the engine, and
    second means for performing at least one of connecting and disconnecting at least a portion of the impedance means in dependence on at least a value of a second operating parameter,
    a first electronic control stage means for connecting the impedance means to the transducer means, and
    wherein said means for performing connection and disconnection comprises
    a first threshold switch means triggerable at a first rpm, $n_1$, a fourth threshold switch means triggerable at a fourth rpm, $n_4$, wherein $n_1 < n_4$,
    an inverter means for receiving as an input the output of the fourth threshold switch means, and
    an AND gate means receiving as inputs the outputs of the first threshold switch means and the inverter means for providing an input to the first electronic control stage means.

7. An ignition system as set forth in claim 6, comprising
    switch means for receiving a signal representing a predetermined value of an operating parameter of the engine,
    a third AND gate means receiving as inputs at least an output of said AND gate and an output of said switch means to produce at least one output employed as input to said electronic control stage means.

8. An ignition system according to claim 6, wherein the ignition system further comprises
    a second impedance means, second electronic control stage means for connecting the second impedance means to the transducer means, a second threshold switch means triggerable at a second rpm, $n_2$, wherein $n_1 < n_2 < n_4$.

a third threshold switch means triggerable at a third rpm, $n_3$, wherein $n_1 < n_2 < n_3 < n_4$, a second inverter means for receiving as an input the output of the third threshold switch means, a second AND gate means receiving as inputs the outputs of the second threshold circuit means and the second inverter means for providing an input to the second electronic control stage means.

9. An ignition system as set forth in claim 8, comprising switch means for receiving a signal representing a pedetermined value of an operating parameter of the engine, a third AND gate means receiving as inputs at least an output of said second AND gate and an output of said switch means to produce at least one output employed as input to said second electronic control stage means.

10. An ignition system for internal combustion engines having an ignition coil with primary circuit comprising an inductive transducer means for timing control of the primary circuit of the ignition coil, impedance means for varying the phase position of an output signal of the inductive transducer means for varying the instant of ignition, first means for connecting at least a portion of the impedance means to the transducer means as an additional load in dependence on a first value of a first operating parameter of the engine, and second means for performing at least one of connecting and disconnecting at least a portion of the impedance means in dependence on at least a value of a second operating parameter, wherein said second means comprises means for connecting at least a portion of the impedance means to the transducer means at a specific rpm of the engine, and means for disconnecting the portion of the impedance means at a higher rpm.

11. An ignition system according to claim 10, wherein at least a portion of the impedance means is connected to and disconnected from the transducer means in joint dependency on the full-load operating range of the engine and on respective predetermined magnitudes of rpm of the engine.

12. An ignition system according to claim 10, wherein the impedance means comprises at least two subsidiary impedance means and means for connecting the subsidiary impedance means in succession and in parallel with one another to and successively disconnecting the subsidiary impedance means from the transducer means with increasing rpm of the engine.

13. An ignition system according to claim 10, wherein said means for connecting comprises a first electronic control means having a continuously decreasing resistance value for connecting the impedance means to the transducer means as engine rpm increases.

14. An ignition system according to claim 13, wherein said means for disconnecting comprises means for continuously increasing the resistance value of second electronic control element.

15. An ignition system as set forth in claim 13, wherein said means for performing one of connection and disconnection comprises a first analog control means for connecting at least a portion of the impedance means to the transducer means with a first resistance value and said ignition system further comprises a signal converter means for providing an output signal representative of a first value of an engine operating parameter, a first threshold switch means for receiving at its input the output of the signal converter and controlled by a first value of said engine operating parameter, a second threshold switch means connected in parallel with the first threshold switch means at the input thereof and controlled by a second value higher than the first value of the engine operating parameter, first amplifier means for receiving as an input the output of the signal converter means and for receiving as control input the output of said first threshold switch means to actuate said first analog control means, second amplifier means for receiving as an input the output of the signal converter means and for receiving as a control input the output of the second threshold switch means to produce an output, and a second analog control means receiving an output of said second amplifier means for attenuating the signal output of the first amplifier input to said first analog control means.

16. An ignition system according to claim 15, comprising means for limiting the signal of the first amplifier to a specific maximum value to limit the retarded setting value of an ignition angle ($\alpha$).

* * * * *